May 13, 1958  J. A. McNAB  2,834,619
FLUID SEAL MEANS FOR ROTATING SHAFTS
Filed April 15, 1955
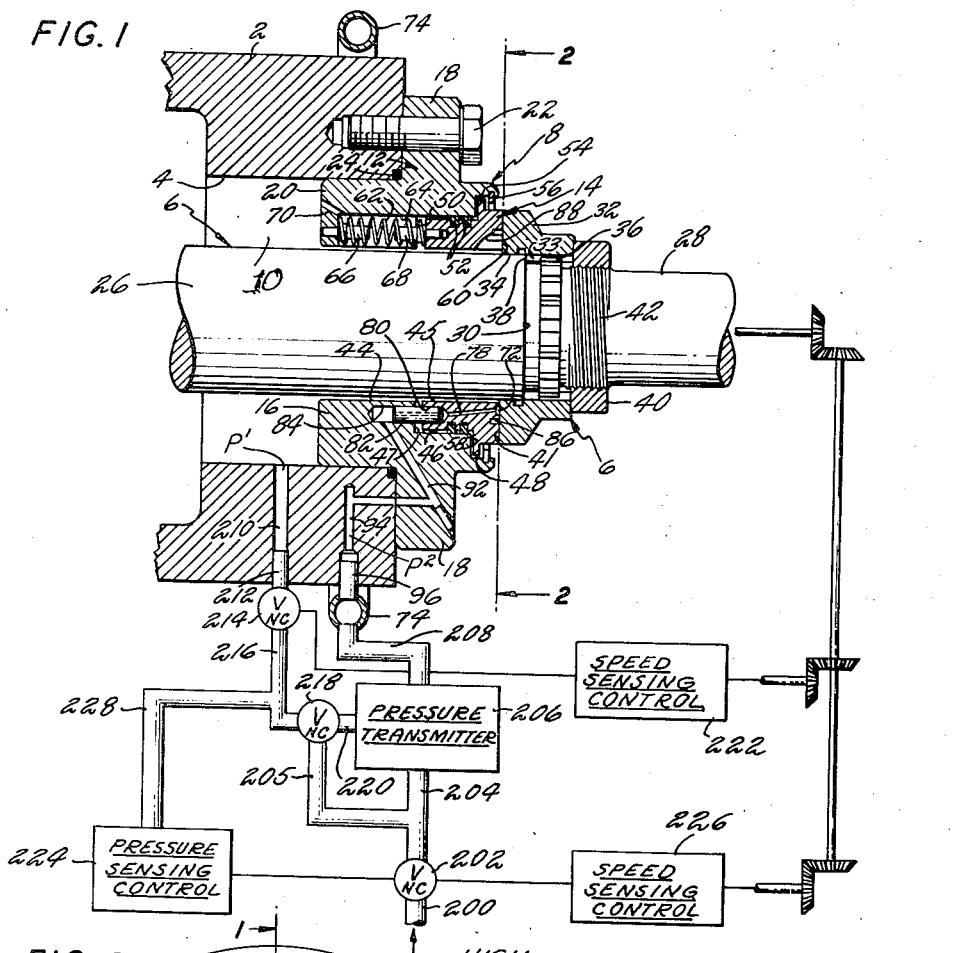
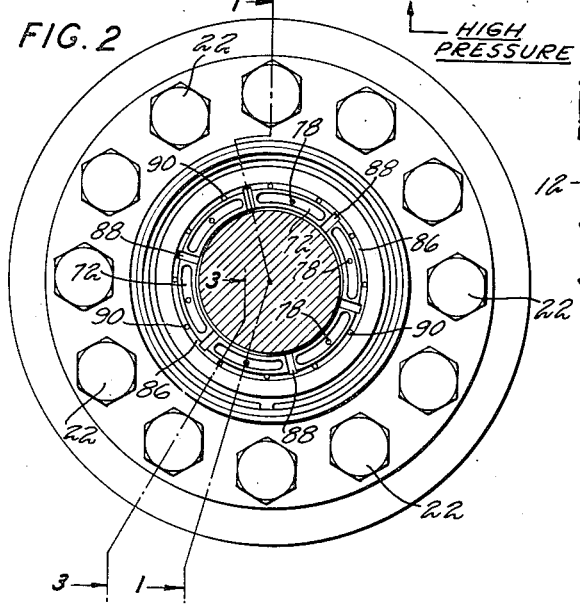
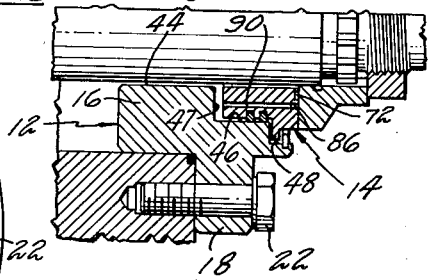
INVENTOR
JOHN A. McNAB
BY Jack N. McCarthy
AGENT

United States Patent Office 2,834,619
Patented May 13, 1958

2,834,619
FLUID SEAL MEANS FOR ROTATING SHAFTS

John A. McNab, Glastonbury, Conn., assignor to United Aircraft Corporation, East Hartford, Conn., a corporation of Delaware Application April 15, 1955, Serial No. 501,703

8 Claims. (Cl. 286—9)

This invention relates to a combination seal and bearing with means for controlling a minimum film thickness therein.

An object of this invention is to overcome in a combination bearing and seal the problem of metallic contact at high rubbing velocities.

Another object of this invention is to provide a bearing which provides a certain minimum film thickness of clearance between the main or stationary portion of the seal and the rotating member associated therewith.

A further object of this invention is to provide a control for providing said film thickness.

Another object of this invention is to provide a control which is responsive to the speed of the rotating shaft around which the combined seal and bearing is necessary.

A further object of this invention is to provide a control which is responsive to the pressure of the fluid to be sealed.

Further objects and advantages will be apparent from the specification and drawings.

Fig. 1 is a longitudinal sectional view of the bearing and seal taken along the line 1—1 of Fig. 2.

Fig. 2 is a view taken along the line 2—2 of Fig. 1 showing the device in full with the shaft shown in section.

Fig. 3 is a view taken along the line 3—3 of Fig. 2.

Referring to Figure 1, a portion of a housing 2 is shown having a shaft receiving opening 4. A shaft assembly 6 is shown extending through said opening 4 and is mounted for rotation by means not shown. A bearing and seal assembly 8 is mounted between said housing and shaft assembly 6.

The bearing and seal assembly 8 consists of two main parts. These parts are (a) the seal adapter 12 and (b) the seal body 14. The seal adapter 12 comprises a sleeve member 16 with an external annular flange 18 mounted therearound between its ends. Inner end 20 of the sleeve member 16 is positioned within the shaft receiving opening 4 of the housing 2 while the flange 18 is bolted to the exterior of the housing 2 by bolts 22. An O-ring 24 is positioned in a groove in housing 2 adjacent the shaft receiving opening 4 to provide a seal between the housing 2 and the seal adapter 12.

The shaft assembly 6 comprises a shaft formed of a section 26 and a stepped-down section 28. An annular surface 30 is formed where these two shaft sections intersect. A circular flange member 32 is part of the shaft assembly 6 and is fixed to the shaft in the following manner. Flange member 32 has an inner circular surface 34 dimensioned to fit over shaft section 26 with the remainder of the inner circumference of the flange 32 being splined with splines 33 to fit over the splines 36 projecting from shaft section 28. The ends 38 of the splines 33 abut the annular surface 30. This splined connection fixes the flange member 32 against rotation relative to the shaft. Nut 40 threadably engages the threads 42 on section 28 to axially fix this flange member 32. A bearing and seal face 41 is provided on said flange member 32 for a purpose to be hereinafter described.

Sleeve member 16 of the seal adapter 12 is formed of three inner surfaces 44, 46 and 48, each having a different diameter. Surface 44 is dimensioned so that there is a small clearance between it and the shaft section 26 which passes therethrough. Surfaces 46 and 48 are dimensioned to receive the seal body 14. Seal body 14 is formed as an annular member with an inner surface 45 having a diameter equal to that of the surface 44 of the seal adapter 12. The outer surface of the seal body 14 is formed having one section 50 dimensioned so as to fit within the surface 46 of the seal adapter 12. Two sealing rings 52 are positioned in grooves in the surface 50 of the seal body 14 to engage the inner surface 46 of the seal adapter 12. This type seal permits axial movement between the seal adapter 12 and seal body 14. An annular flange 54 extends outwardly from the seal body 14 to a line adjacent the surface 48 of the seal adapter 12. A snap ring 56 is provided in a groove in the surface 48 of seal adapter 12 to limit the axial movement of the seal body 14 with respect to the seal adapter in a direction to the right in Fig. 1. The annular face 58 on seal body 14 limits axial movement of the seal body in the other direction.

The seal body 14 has a face 60 which faces towards the bearing and seal face 41 of the flange member 32. In a stationary position these faces are held in engagement by a plurality of springs 62 which are spaced equally around the interior of the seal adapter 12, one each in a spring retaining chamber 64 formed in the inner surface 44. For each spring 62, a spring guide 66 is positioned in the end of its chamber 64 on seal adapter 12 and a spring guide 68 is positioned on the end of the seal body 14 adjacent the chamber. Spring guide 68 extends into the chamber 64 of the spring it is guiding. A passage 70 connects each chamber with the area 10 on one side of the housing. In the construction shown there are six (6) equally spaced chambers 64.

Face 60 of the seal body 14 functions as a bearing around its inner portion and as a seal around its outer portion. The bearing surface has six (6) pockets 72 equally spaced therearound. Each of these pockets is connected to a manifold 74 (Fig. 1) in the following manner. From the center of each pocket 72 a passageway 78 extends through the seal body 14. Each passageway is formed as a bore 80 in the opposite end of the seal body. Bores 80, of which there are six (6), are equally spaced around this end surface of the seal body 14. A plurality of transfer tubes 82 extend from the face 47 formed where inner surfaces 44 and 46 of seal adapter 12 meet. Each tube is equidistantly spaced between each pair of chambers 64 and is fixed in the end of a bore 84. One transfer tube 82 extends into each bore 80 and has a slidable engagement therewith. These transfer tubes 82 also prevent relative rotation between seal adapter 12 and the seal body 14. Each bore 84 is connected to the manifold 74 by a passageway 92 in the seal adapter 12, a passageway 94 in the housing 2, and a conduit 96 extending between the housing 2 and manifold 74.

The bearing surface of the face 60 of the seal body 14 also includes an annular groove 86 which extends around the pockets 72, being located between the pockets and the seal portion of face 60. To prevent choking around the bearing, relief slots 88 connect the annular groove 86 to the clearance formed between the inner surface of seal body 14 and shaft section 26. A plurality of passageways 90 have also been provided for this purpose. They extend through the seal body 14 and connect the annular groove 86 to the other end of the seal body 14, In operation, the fluid to be sealed substantially fills the area 10, the open portion of shaft opening 4, the clearance area between seal adapter 12 and shaft section 26, and seal body 14 and shaft section 26, slots 88, annular groove 86, passageways 90, chambers 64, passageways 70 and the area between the seal adapter 12 and seal body 14 up to the sealing rings 52. For low pressures of the fluid to be sealed and for low shaft speed, the operation of this seal is sufficient so that an operating fluid is not needed in the pockets 72. During operation in this manner, the springs 62 tend to maintain contact between the bearing and seal face 41 of the flange member 32 and the face 60 of the seal body 14. However, at or above a predetermined pressure of the fluid being sealed and at or above a predetermined shaft speed, it is necessary that a fluid be applied to each of the six pockets 72 at a pressure which is greater than that pressure being sealed by some fixed amount. This is, when a fluid is being provided to the pockets 72, $$P_2 = P_1 + C$$

where:

$P_2$ = the pressure being applied to the pockets;
$P_1$ = the pressure of the fluid being sealed;
$C$ = the constant pressure value by which $P_2$ exceeds $P_1$.

This application of fluid applied to the pockets 72 maintains a certain minimum film thickness between the seal body 14 and flange 32. The seal surface being integral with the bearing surface maintains the same relative clearance. While this may not be as efficient as a rubbing face seal, the leakage is small enough to be tolerated in view of the extended surface life.

The control device which provides the pressure to manifold 74, and therefore, to the pockets 72, when the pressure of the fluid being sealed is at or above a predetermined value or when the shaft speed is at or above a predetermined value, while maintaining the pressure at a constant value over the pressure of the fluid being sealed, is shown in Fig. 1. A high pressure source of fluid is connected by a conduit 200 to a normally closed solenoid valve 202. The outlet of this valve is connected to a pressure transmitter 206 by a conduit 204. The outlet of pressure transmitter 206 is connected to manifold 74 by conduit 208. The pressure transmitter is of a type well known in the art. The pressure of the fluid being sealed is transferred to the pressure transmitter as a reference pressure. A passageway 210 in housing 2 connects the interior of the housing to a conduit 212 which is in turn connected to the inlet of a normally closed solenoid valve 214. The outlet of this normally closed solenoid valve 214 is connected to the inlet of a normally closed pressure actuated valve 218 by a conduit 216. The outlet of the normally closed pressure actuated valve 218 is connected to the pressure transmitter 206 by a conduit 220. This valve 218 is actuated by a pressure directed thereto from conduit 204 by conduit 205.

The solenoid of the normally closed solenoid valve 214 is actuated by a signal from a speed sensing control 222. This speed sensing control 222 sends this signal to open and maintain open normally closed solenoid valve 214 whenever the shaft is rotated, regardless of speed. The shaft rotation is conveyed to the speed sensing control by a series of bevel gears in a direct drive arrangement.

The solenoid of normally closed solenoid valve 202 can obtain a signal to open or maintain open said valve from one or both of two sensing controls, (a) a pressure sensing control 224, and (b) a speed sensing control 226. The speed and pressure sensing controls are of a type well known in the art. Pressure sensing control 224 has the pressure of the sealed fluid directed thereto for its operation by conduit 228 which is connected to conduit 216. Speed sensing control 226 has the shaft rotation conveyed thereto for its operation by a series of bevel gears in a direct drive arrangement. The pressure sensing control 224 sends its signal to normally closed solenoid valve 202 whenever the pressure of the fluid to be sealed is at or above some predetermined value. The speed sensing control 226 sends its signal to normally closed solenoid valve 202 whenever the shaft is rotating at or above some predetermined value of speed. The predetermined value of pressure set in the pressure sensing control 224 and the predetermined value of speed set in the speed sensing control 226 can be varied as the situation requires.

*Operation*

When the shaft assembly 6 begins to rotate, this movement is conveyed to the speed sensing control 222 which in turn sends a signal to normally closed solenoid valve 214 to open said valve. This valve remains open as long as the shaft assembly is rotating. This permits the pressure of the fluid being sealed to be transmitted through conduit 216 to normally closed pressure actuated valve 218 and be transmitted through conduit 228 to the pressure sensing control 224.

Now, while the shaft assembly rotates at a speed lower than some value set in the speed sensing control 226 and the pressure of the fluid to be sealed remains below a value set in a pressure sensing control 224, no fluid is transmitted to the pockets 72 in the face 60 of the seal body 14. However, when the pressure of the fluid to be sealed does reach a value as set in the pressure sensing control 224 or when the speed of the shaft assembly 6 reaches a value as set in the speed sensing control 226, a signal is sent to the normally closed solenoid valve 202 to open said valve. This signal continues to be sent while the pressures or speeds remain at or above the set values. Either one of these controls can open this valve 202 and either one can hold it open. The high pressure fluid then passes through conduit 204 to the pressure transmitter 206 and at the same time passes through conduit 205 to open normally closed pressure actuated valve 218. The opening of pressure valve 218 permits the pressure of the fluid to be sealed to be directed to the pressure transmitter through conduit 220. The pressure transmitter 206 is set to transmit to the pockets 72 a pressure which is greater than the pressure of the fluid to be sealed by some given amount, C. This pressure transmitter maintains this relationship throughout a range of pressures of the fluid to be sealed.

Although only one embodiment of this invention has been illustrated and described herein, it will be apparent that various changes and modifications may be made in the construction and arrangement of the various parts without departing from the scope of this novel concept.

I claim:

1. In combination, a rotating shaft, a nonrotating member through which said shaft extends having on one side thereof a fluid under pressure, and means for sealing said shaft with said nonrotating member, said sealing means including a flange means fixed on said shaft, said flange means having a first annular face thereon, said nonrotating member having a second annular face thereon biased against said first annular face, said second annular face having a plurality of arcuate pockets of substantial area therein, said second face also having an annular groove therearound between said pockets and the outer edge of said face, means connecting said pockets under one condition of operation with an independent source of fluid under pressure which is greater than the pressure of fluid on said one side of said member, means for directing the fluid on said one side of said nonrotating member to said annular groove under a different condition of operation.

2. In combination, a rotating shaft, a nonrotating member through which said shaft extends, having on one side thereof a fluid under pressure, and a device for sealing said shaft with said nonrotating member, said sealing device including a flange means fixed on said shaft, said flange means having a first annular face thereon, stationary seal means located around said shaft and between said nonrotating member and said flange means, said seal means having a second annular face thereon biased against said first annular face, said second annular face having a plurality of arcuate pockets therein of substantial cross sectional area, said second face also having an annular groove therearound between said pockets and the outer edge of said face, means for directing the fluid on said one side of said nonrotating member to said annular groove, and means for connecting said pockets to an independent source of pressure fluid including transfer tubes located in aligned passages in said nonrotating member and in said seal means.

3. In combination, a rotating shaft, a nonrotating member through which said shaft extends having on one side thereof a fluid under pressure, and means for sealing said shaft with said nonrotating member, said sealing means including a flange means fixed on said shaft, said flange means having a first annular face thereon, said nonrotating member having a second annular face thereon biased against said first annular face, said second annular face having a plurality of pockets therein, said second face also having an annular groove therearound between said pockets and the outer edge of said face, means for directing the fluid on said one side of said nonrotating member to said annular groove, means for connecting said pockets to an independent source of high pressure fluid including conduit means from said source to said pockets, a pressure transmitter in said conduit means, a normally closed valve in said conduit means between said source and said transmitter, a speed sensing control device driven by said shaft for opening said valve at a predetermined speed of said shaft, means for controlling the pressure of fluid discharged by said transmitter to said pockets including a second conduit means connecting said fluid to be sealed to said transmitter.

4. In combination, a rotating shaft, a nonrotating member through which said shaft extends having on one side thereof a fluid under pressure to be sealed, and means for sealing said shaft with said nonrotating member, said sealing means including a flange means fixed on said shaft, said flange means having a first annular face thereon, said nonrotating member having a second annular face thereon biased against said first annular face, said second annular face having a plurality of pockets therein, said second face also having an annular groove therearound between said pockets and the outer edge of said face, means for directing the fluid on said one side of said nonrotating member to said annular groove, means connecting said pockets to an independent source of fluid pressure including conduit means for directing the fluid from said independent source to said pockets, a pressure transmitter in said conduit means, a normally closed valve in said conduit means between said source and said transmitter, a speed sensing control device driven by said shaft for opening said valve at a predetermined speed of said shaft, means for controlling the pressure of fluid discharged by said transmitter to said pockets including a second conduit means connecting said fluid to be sealed to said transmitter, a second normally closed valve in said second conduit means, a second speed sensing device driven by said shaft for opening said second valve in response to rotation of said shaft.

5. In combination, a rotating shaft, a nonrotating member through which said shaft extends having on one side thereof a fluid under pressure to be sealed, and means for sealing said shaft with said nonrotating member, said sealing means including a flange means fixed on said shaft, said flange means having a first annular face thereon, said nonrotating member having a second annular face thereon biased against said first annular face, said second annular face having a plurality of pockets therein, said second face also having an annular groove therearound between said pockets and the outer edge of said face, means for directing the fluid on said one side of said nonrotating member to said annular groove, means for connecting said pockets with a source of high pressure fluid, said last named means including conduit means from said source to said pockets, a pressure transmitter in said conduit means, a normally closed valve in said conduit means between said source and said transmitter, means for controlling the pressure of fluid discharged by said transmitter to said pockets including a pressure sensing control device for controlling said valve, a second conduit means connecting said fluid to be sealed to said pressure sensing device.

6. In combination, a rotating shaft, a nonrotating member through which said shaft extends having on one side thereof a fluid under pressure to be sealed, and a device for sealing said shaft with said nonrotating member, said sealing device including a flange means fixed on said shaft, said flange means having a first annular face thereon, seal means located around said shaft and between said nonrotating member and said flange means, said seal means having a second annular face thereon biased against said first annular face, said second annular face having a plurality of pockets therein, said second face also having an annular groove therearound between said pockets and the outer edge of said face, means for directing the fluid on said one side of said nonrotating member to said annular groove, means connecting said pockets to an independent source of pressure fluid including conduit means from said source to said pockets, a pressure transmitter in said conduit means, a normally closed valve in said conduit means between said source and said transmitter, means for controlling the pressure of fluid discharged by said transmitter to said pockets including a pressure sensing control device for controlling said valve, a second conduit means connecting said fluid to be sealed to said pressure sensing device, a second normally closed valve in said second conduit means between said pressure sensing device and said fluid to be sealed, and a speed sensing device driven by said shaft for opening said second valve in response to rotation of said shaft.

7. In combination, a rotating shaft, a nonrotating member through which said shaft extends having on one side thereof a fluid under pressure to be sealed, and a device for sealing said shaft with said nonrotating member, said sealing device including a flange means fixed on said shaft, said flange means having a first annular face thereon, stationary seal means located around said shaft and between said nonrotating member and said flange means, said seal means having a second annular face thereon biased against said first annular face, said second annular face having a plurality of pockets therein, said second face also having an annular groove therearound between said pockets and the outer edge of said face, means for directing the fluid on said one side of said nonrotating member to said annular groove, means connecting said pockets to an independent source of high pressure fluid including first conduit means from said source to said pockets, a pressure transmitter in said first conduit means, a first normally closed valve in said first conduit means between said source and said transmitter, a speed sensitive device driven by said shaft for opening said first valve at a predetermined speed of said shaft, means for controlling the pressure of fluid discharged by said transmitter to said pockets including a second conduit means connecting said fluid to be sealed to said transmitter, a pressure sensing device for opening said first valve at a predetermined pressure of fluid to be sealed, a third conduit means connecting said fluid to be sealed to said pressure sensing device, a second normally closed pressure responsive valve in said second conduit means, and means for opening said second valve including a third conduit means connecting said second valve to said first conduit means between said transmitter and said first valve.

8. In combination, a rotating shaft, a nonrotating member through which said shaft extends having on one side thereof a fluid under pressure to be sealed, and a device for sealing said shaft with said nonrotating member, said sealing device including a flange means fixed on said shaft, said flange means having a first annular face thereon, stationary seal means located around said shaft and between said nonrotating member and said flange means, said seal means having a second annular face thereon biased against said first annular face, said second annular face having a plurality of pockets therein, said second face also having an annular groove therearound between said pockets and the outer edge of said face, means for directing the fluid on said one side of said nonrotating member to said annular groove, means connecting said pockets to an independent source of high pressure fluid including first conduit means from said source to said pockets, a pressure transmitter in said first conduit means, a first normally closed valve in said first conduit means between said source and said transmitter, a first speed sensitive device driven by said shaft for opening said first valve at a predetermined speed of said shaft, means for controlling the pressure of fluid discharged by said transmitter to said pockets including a second conduit means connecting said fluid to be sealed to said transmitter, a pressure sensing device for opening said first valve at a predetermined pressure of fluid to be sealed, a third conduit means connecting said fluid to be sealed to said pressure sensing device, a second normally closed pressure responsive valve in said second conduit means, means for opening said second valve including a third conduit means connecting said second valve to said first conduit means between said transmitter and said first valve, a second speed sensing device driven by said shaft, a third normally closed valve means opened by said second speed sensing device whenever said shaft is rotating for supplying fluid to be sealed to said pressure sensing device.

References Cited in the file of this patent

UNITED STATES PATENTS

| | | |
|---|---|---|
| 1,265,488 | Nolan | May 7, 1918 |
| 2,555,492 | Kidney | June 5, 1951 |
| 2,581,764 | Leibing | Jan. 8, 1952 |
| 2,602,680 | Church | July 8, 1952 |
| 2,649,318 | Skillman | Aug. 18, 1953 |
| 2,665,122 | Rowland | Jan. 5, 1954 |